(12) United States Patent
Wipf

(10) Patent No.: US 9,402,341 B1
(45) Date of Patent: Aug. 2, 2016

(54) SEED FIRMER

(71) Applicant: Danny Wipf, Lake Andes, SD (US)

(72) Inventor: Danny Wipf, Lake Andes, SD (US)

(*) Notice: Subject to any disclaimer, the term of this patent is extended or adjusted under 35 U.S.C. 154(b) by 0 days.

(21) Appl. No.: 14/605,221

(22) Filed: Jan. 26, 2015

(51) Int. Cl.
*A01C 7/20* (2006.01)
(52) U.S. Cl.
CPC .......................................... *A01C 7/20* (2013.01)
(58) Field of Classification Search
CPC ............ A01C 13/00; A01C 5/00; A01C 7/04; A01C 7/20
USPC .............................. 111/84, 177–181, 189, 190
See application file for complete search history.

(56) References Cited

U.S. PATENT DOCUMENTS

| | | | | |
|---|---|---|---|---|
| 2,872,883 A * | 2/1959 | Padrick | ................... | A01C 5/062 111/150 |
| 3,122,111 A * | 2/1964 | Taylor, Sr. | ............... | A01C 7/20 111/140 |
| 5,060,585 A * | 10/1991 | Alexander | ............. | A01C 7/006 111/134 |
| 6,220,191 B1 * | 4/2001 | Peter | ......................... | A01C 5/06 111/118 |
| D488,686 S * | 4/2004 | Schneider | ........................... | D8/1 |
| 7,617,782 B2 * | 11/2009 | Sheppard | ............... | A01C 5/062 111/135 |
| 9,155,244 B2 * | 10/2015 | Schaffert | ............... | A01C 7/206 |
| 2015/0250094 A1 * | 9/2015 | Hodel | ................... | A01C 5/068 111/189 |

* cited by examiner

*Primary Examiner* — John G Weiss
(74) *Attorney, Agent, or Firm* — Jeffrey A. Proehl; Woods, Fuller, Shultz & Smith, P.C

(57) ABSTRACT

A seed firmer for use on a seed boot having a guide plate with a rear edge may include an elongated main portion having a mount end for mounting to the boot and a free end extending away from the boot. The main portion may have broad faces and narrow sides extending between the broad faces. The firmer may have a guide portion positioned at a medial location on the guide portion between the ends. The guide portion may have a thin, planar character that protrudes from the main portion in a plane that is oriented generally perpendicular to a plane of one broad face. The guide portion may have a peripheral edge with a substantially linear section and an arcuate section, and the substantially linear section may be positionable adjacent to the guide plate when the main portion is mounted on the boot.

17 Claims, 5 Drawing Sheets

SEED FIRMER

BACKGROUND

Field

The present disclosure relates to seed guides or seed firmer devices and more particularly pertains to a new seed firmer for guiding seed from an air seeder to the furrow.

SUMMARY

In one aspect, the disclosure relates to a seed firmer for use on a seed boot to guide seed dispensed from the seed boot, with the seed boot having a guide plate with a rear edge. The firmer may comprise an elongated main portion configured to mount on the seed boot and extend from the seed boot, and the main portion may have a mount end for mounting to the seed boot and a free end extending away from the seed boot, the main portion having a pair of broad faces and a pair of narrow sides extending between the broad faces. The firmer may have a guide portion positioned at a medial location on the guide portion between the ends. The guide portion may have a thin, planar character that protrudes from the main portion in a plane that is oriented generally perpendicular to a plane of one of the broad faces. The guide portion may have a peripheral edge with a substantially linear section and an arcuate section, with the substantially linear section being positionable adjacent to the guide plate of the seed boot when the main portion is mounted on the seed boot.

In another aspect, the present disclosure relates to a seeder assembly that may comprise a seed boot to guide dispensed seed toward a ground surface. The seed boot may define a passage with an outlet, and may have a guide plate with a rear edge. The assembly may also comprise a seed firmer having an elongated main portion mounted on the seed boot and extending from the seed boot. The main portion may have a mount end mounted in the seed boot adjacent to the outlet and a free end extending away from the seed boot. The main portion may have a pair of broad faces and a pair of narrow sides extending between the broad faces, and the seed firmer may have a guide portion protruding from the main portion at a medial location on the guide portion between the ends. The guide portion may protrude from the main portion in a plane that is oriented generally perpendicular to a plane of one of the broad faces and parallel to the guide plate. The guide portion may have a peripheral edge with a substantially linear section and an arcuate section, with the substantially linear section being positioned adjacent to the rear edge of the guide plate of the seed boot when the main portion is mounted on the seed boot such that the guide portion forms an extension of the guide plate.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
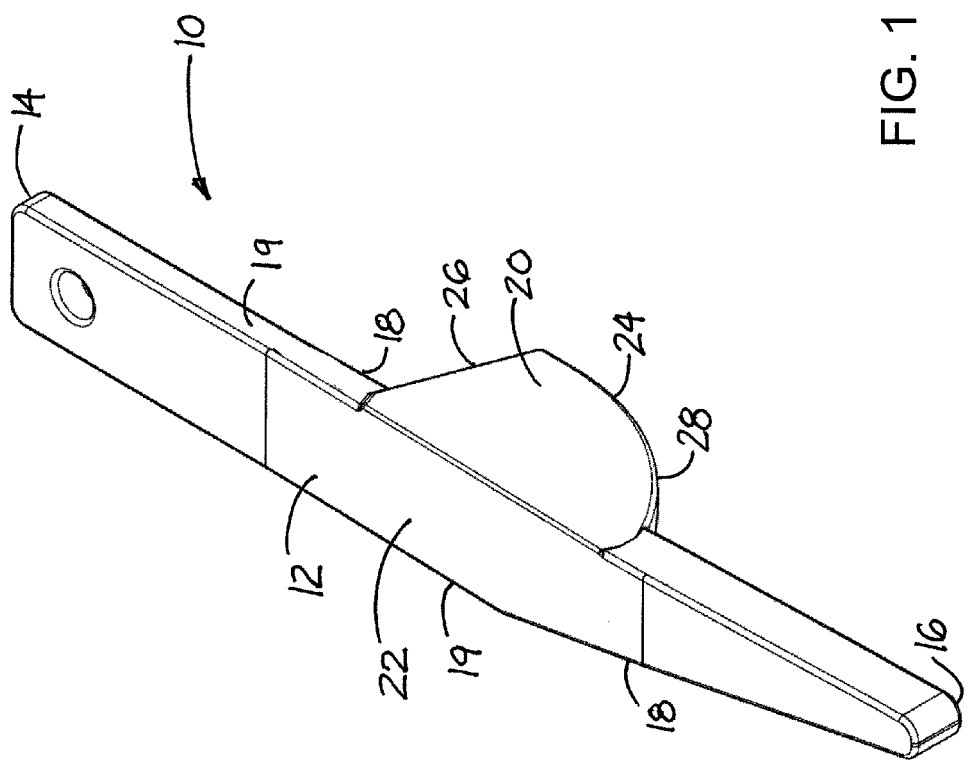
FIG. 1 is a schematic perspective view of a new seed firmer according to the present disclosure.
Figure 2:
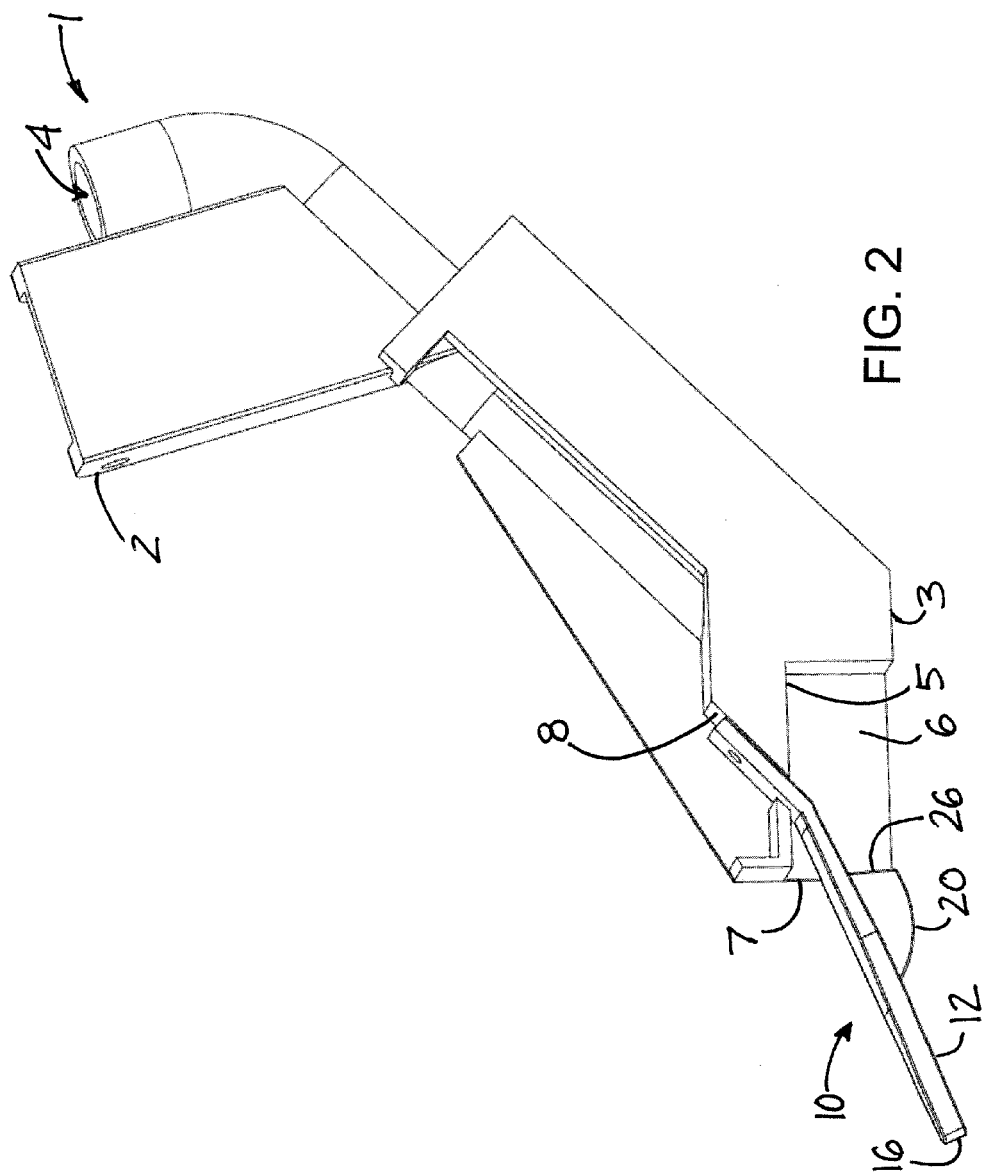
FIG. 2 is a schematic a first side perspective view of the seed firmer mounted on a seed boot, according to an illustrative embodiment.
Figure 3:
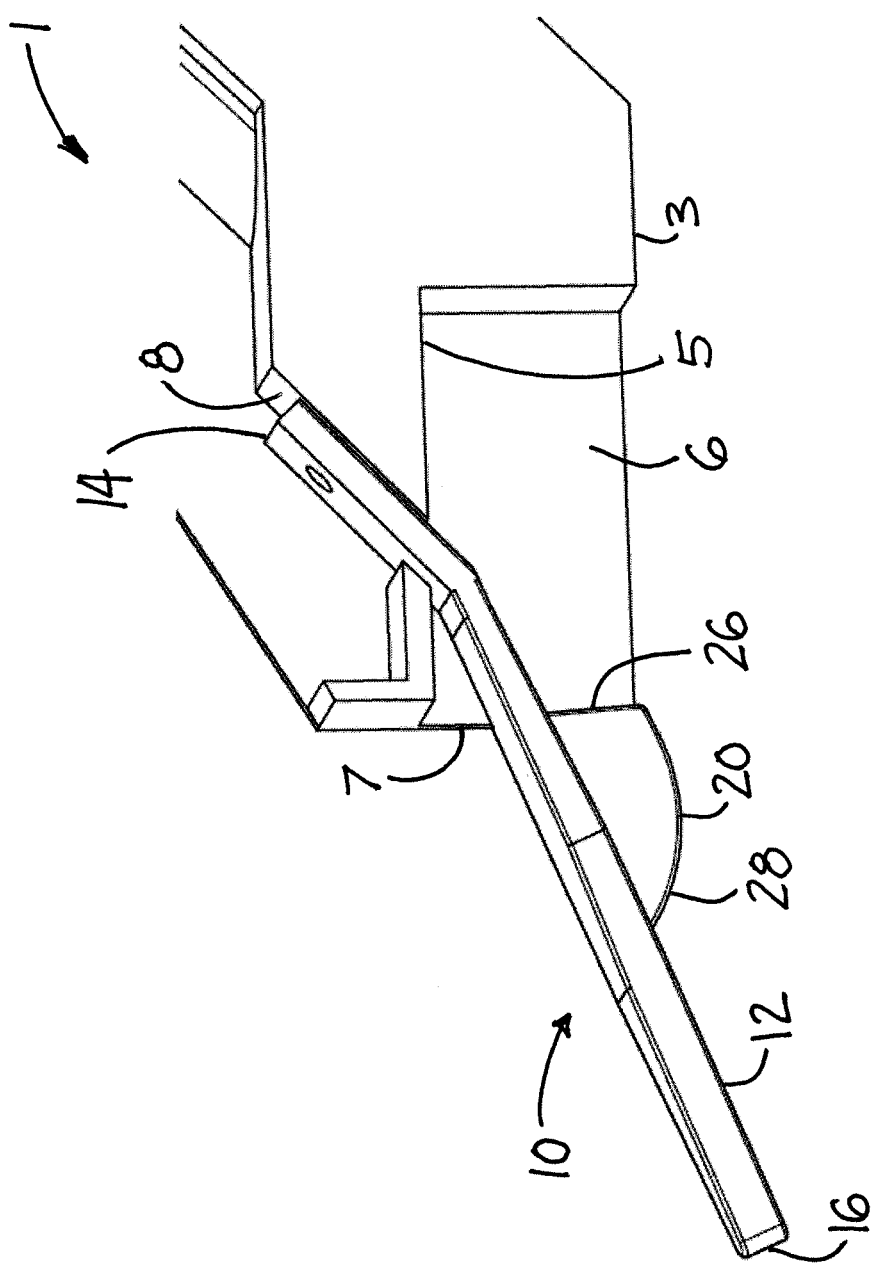
FIG. 3 is a schematic enlarged fragmentary perspective view of the seed firmer and a portion of the seed boot, according to an illustrative embodiment.
Figure 4:
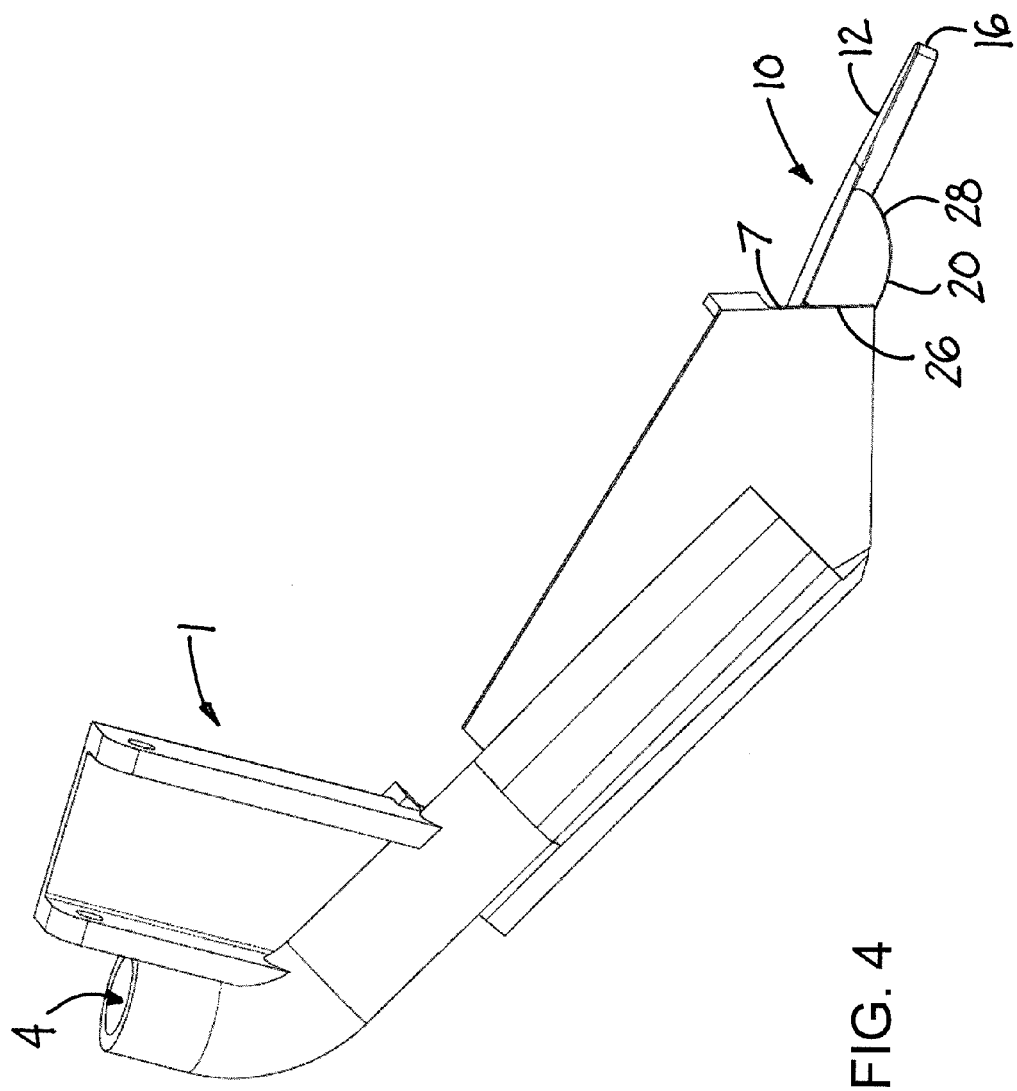
FIG. 4 is a schematic a second side perspective view of the seed firmer mounted on a seed boot, according to an illustrative embodiment.
Figure 5:
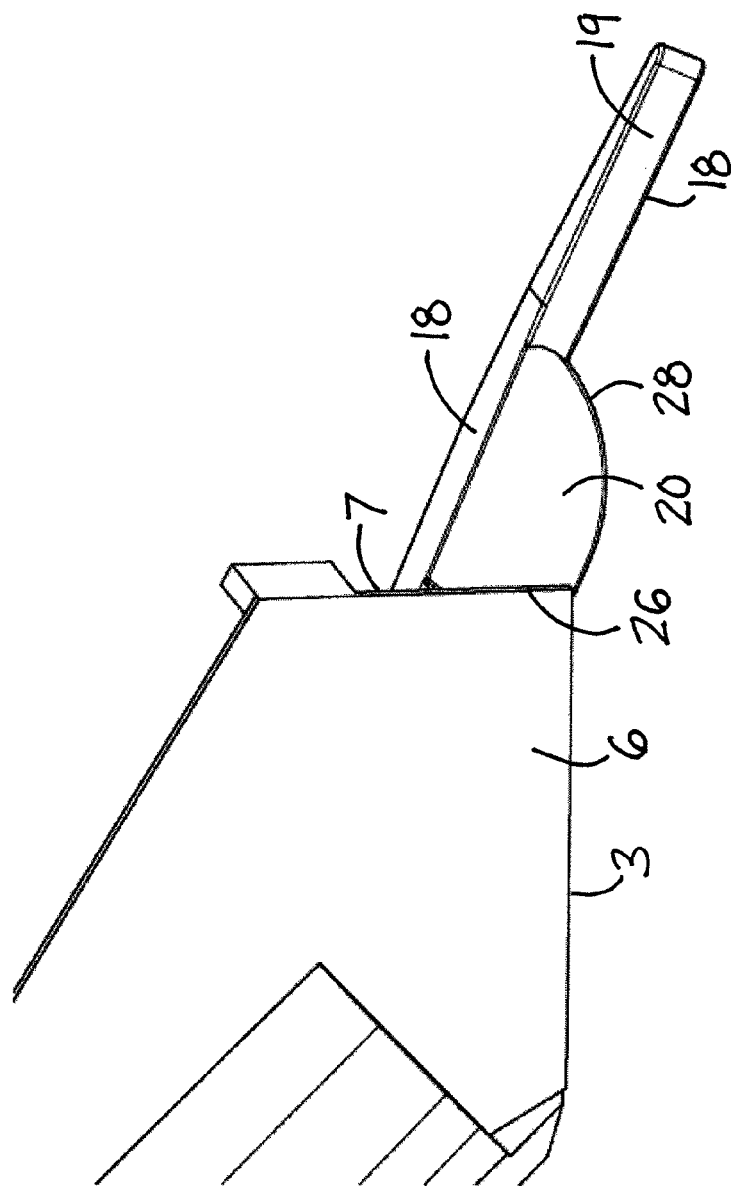
FIG. 5 is a schematic enlarged fragmentary perspective view of the seed firmer and a portion of the seed boot, according to an illustrative embodiment.

With reference now to the drawings, and in particular to FIGS. 1 through 5 thereof, a new seed boot embodying the principles and concepts of the disclosed subject matter will be described.

Applicant has recognized that while the use of a seed firmer is beneficial in guiding seed into the furrow and not on the surrounding ground surface, the guidance provided by the seed firmer could be improved in a lateral direction, since known seed firmers primarily provide guidance in a vertical direction. Applicant has altered the seed firmer to include a wing portion that may cooperate with the guide plate of the seed boot to further enhance the guidance provided by the guide plate to a position in the furrow.

In one aspect, the disclosure generally relates to a seed firmer 10 or seed guide for use with an air seeder assembly that may include a base mount and seed boot 1 mounted on the base mount. The air seeder assembly is generally mounted on and supported above the ground by an agricultural implement that is towed behind a tractor, and an air seeder assembly is generally included for each row to be planted per pass of the implement across the field.

The seed firmer is generally mounted on the seed boot 1 which is removably mountable on the base mount. The seed boot has an upper end 2 which is generally mounted on the base mount, and has a lower end 3 positioned toward the ground surface. The seed boot may define a passage 4 through which a seed moves from a seed delivery system to a furrow in the ground. The passage may generally extend from the upper end 2 toward the lower end 3, with the passage 4 having an outlet 5 located generally adjacent to the lower end. The seed boot may form a conduit defining the passage 4 and leading to the outlet 5.

The seed boot 1 may also include a guide plate 6 which may extend at least from the outlet 5 of the conduit towards the lower end 3 of the seed boot. The guide plate 6 may be configured such that it has a substantially vertical orientation when the seed boot is mounted on a base mount, and the guide plate may have a rear edge 7 which is generally oriented rearwardly when the seed boot is so mounted. The seed boot may also have a mount surface 8 which may be formed on the seed boot generally adjacent to the conduit outlet 5 and the guide plate 6.

The seed firmer 10 may be mountable on the seed boot 1 for guiding a seed exiting the passage 4. At least a portion of the seed firmer 10 may be positioned adjacent to the outlet 5 of the seed boot passage, and may be oriented to extend away from the outlet 5. The seed firmer may be mounted on the mount surface 8 using a suitable manner of fastening, such as, for example, a threaded fastener which passes through a hole formed in the firmer 10.

The seed firmer 10 may be elongated in shape and may be relatively thin in character. The firmer 10 may include a main portion 12 which extends the length of the firmer from a mount end 14 for mounting on the seed boot, as well as a free end 16 that contacts the ground below and/or behind the seed boot. The firmer 10 may have a length measured between the ends 14, 16 of the main portion 12, and a width that is measured perpendicular to the length. The width of the firmer 10 may taper narrower toward the free end 16. The main portion may have a pair of broad faces 18 located on opposite surfaces of the main portion, and may also include a pair of narrow sides 19 which are also located on opposite surfaces of the main portion. The main portion 12 may be formed of a flexible material such as an ultra-high molecular weight material, although other materials of suitable flexibility and durability may also be employed.

Significantly, the seed firmer 10 may also include a wing or guide portion 20 that extends from the main portion 12, and may be located at a medial location 22 on the main portion. The position of the guide portion 20 may be offset from a central longitudinal axis of the main portion, and may extend along a section of one of the sides 19. The guide portion 20 may have a relatively thin, planar character that extends in a plane that is oriented generally perpendicular to the planes of the broad faces 18 and generally parallel to the planes of the sides. The guide portion thus may protrude with respect to one of the faces 18 that is oriented downwardly when the firmer is mounted on the seed boot, and may be configured so that the guide portion does not extend beyond the opposite face of the main portion. When mounted on the seed boot, the seed firmer 10 may extend along a portion of the guide plate 6 as well as extend beyond the rear edge of the guide plate.

The guide portion may have a relatively thin peripheral edge 24, and may be configured with a substantially linear section 26 and an arcuate section 28. The guide portion may be configured so that the edge section 26 is positioned closely adjacent to, and may even abut, the guide plate 6 of the seed boot, and may be positioned at the rear edge 7 of the plate 6. The linear rear edge of the guide plate and the substantially linear edge section of the guide portion may minimize any gap between the guide plate and the guide portion. By this configuration and positioning, when mounted on the seed boot, the guide portion 20 may effectively form an extension of the guide plate that extends closer to the surface of the soil in which the seed is being planted, and may also move with the main portion as the main portion flexes, such as through contact with the ground surface. The substantially linear section 26 of the peripheral edge may be positionable adjacent to the rear edge of the guide plate 6 to accomplish this extension effect, although perfect abutment or contact between the edges is not required, particularly when the seed firmer flexes due to contact between the free end and the soil of the field.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A seed firmer for use on a seed boot to guide seed dispensed from the seed boot, the seed boot having a guide plate with a rear edge, the firmer comprising:
    an elongated main portion configured to mount on the seed boot and extend from the seed boot, the main portion having a mount end for mounting to the seed boot and a free end extending away from the seed boot, the main portion having a pair of broad faces and a pair of narrow sides extending between the broad faces; and
    a guide portion positioned at a medial location on the main portion between the ends, the guide portion being spaced from the mount end and the free end;
    wherein the guide portion has a thin, planar character that protrudes from the main portion in a plane that is oriented generally perpendicular to a plane of one of the broad faces;
    wherein a width of the main portion between the pair of narrow sides tapers narrower toward the free end of the main portion; and
    wherein a thickness of the main portion between the pair of broad faces tapers thinner from the free end toward the mount end.

2. The seed firmer of claim 1 wherein the guide portion protrudes from the main portion in a plane that is oriented generally parallel to a plane of one of the side edges.

3. The seed firmer of claim 1 wherein the main portion is formed of a flexible material.

4. The seed firmer of claim 1 wherein the guide portion has a substantially uniform thickness.

5. A seed firmer for use on a seed boot to guide seed dispensed from the seed boot, the seed boot having a guide plate with a rear edge, the firmer comprising:

an elongated main portion configured to mount on the seed boot and extend from the seed boot, the main portion having a mount end for mounting to the seed boot and a free end extending away from the seed boot, the main portion having a pair of broad faces and a pair of narrow sides extending between the broad faces; and a guide portion positioned at a medial location on the main portion between the ends;

wherein the guide portion has a thin, planar character that protrudes from the main portion in a plane that is oriented generally perpendicular to a plane of one of the broad faces;

wherein the guide portion has a peripheral edge with a substantially linear section and an arcuate section, the substantially linear section being positionable adjacent to the guide plate of the seed boot when the main portion is mounted on the seed boot; and wherein the substantially linear section of the perimeter edge is positioned toward the mount end of the main portion and the arcuate section is located toward the free end.

6. The seed firmer of claim 5 wherein a width of the main portion between the sides tapers narrower toward the free end of the man portion.

7. The assembly of claim 5 wherein the guide portion has a thin, planar character that protrudes from the main portion in a plane that is oriented generally perpendicular to a plane of one of the faces.

8. The assembly of claim 5 wherein the main portion is formed of a flexible material.

9. The assembly of claim 5 wherein the guide portion has a substantially uniform thickness.

10. The assembly of claim 5 wherein a thickness of the main portion between the pair of broad faces tapers thinner from the free end toward the mount end.

11. The assembly of claim 5 wherein the guide portion is spaced from the mount end and the free end.

12. A seeder assembly comprising:
a seed boot to guide dispensed seed toward a ground surface, the seed boot defining a passage with an outlet, the seed boot having a guide plate with a rear edge; and a seed firmer having an elongated main portion mounted on the seed boot and extending from the seed boot, the main portion having a mount end mounted in the seed boot adjacent to the outlet and a free end extending away from the seed boot, the main portion having a pair of broad faces and a pair of narrow sides extending between the broad faces, the seed firmer having a guide portion protruding from the main portion at a medial location on the main portion between the ends;

wherein the guide portion protrudes from the main portion in a plane that is oriented generally perpendicular to a plane of one of the broad faces and parallel to the guide plate; and wherein the guide portion has a peripheral edge with a substantially linear section and an arcuate section, the substantially linear section being positioned adjacent to the rear edge of the guide plate of the seed boot when the main portion is mounted on the seed boot such that the guide portion forms an extension of the guide plate;

wherein the substantially linear section of the perimeter edge is positioned toward the mount end of the main portion and the arcuate section is located toward the free end.

13. The assembly of claim 12 wherein the guide portion has a thin, planar character that protrudes from the main portion in a plane that is oriented generally perpendicular to a plane of one of the faces.

14. The assembly of claim 12 wherein the main portion is formed of a flexible material.

15. The assembly of claim 12 wherein the guide portion has a substantially uniform thickness.

16. The assembly of claim 12 wherein a thickness of the main portion between the pair of broad faces tapers thinner from the free end toward the mount end.

17. The assembly of claim 12 wherein a width of the main portion between the sides tapers narrower toward the free end of the man portion.

* * * * *